United States Patent
Luick et al.

(10) Patent No.: US 10,926,362 B2
(45) Date of Patent: Feb. 23, 2021

(54) REMANUFACTURED ENGINE PISTON AND METHOD

(71) Applicant: Caterpillar Inc., Deerfield, IL (US)

(72) Inventors: Kegan Jon Luick, Dunlap, IL (US); Kevin Byron Williams, Corinth, MS (US); Nguyenbao Huynh Chu, Dunlap, IL (US); Christopher Anthony Kinney, Iuka, MS (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/219,184

(22) Filed: Dec. 13, 2018

(65) Prior Publication Data

US 2020/0189045 A1 Jun. 18, 2020

(51) Int. Cl.
| | |
|---|---|
| *B23P 6/02* | (2006.01) |
| *F02F 3/10* | (2006.01) |
| *F02F 3/26* | (2006.01) |
| *F02F 3/00* | (2006.01) |
| *B23K 26/70* | (2014.01) |
| *B23K 101/00* | (2006.01) |
| *B23K 26/16* | (2006.01) |

(52) U.S. Cl.
CPC ............... *B23P 6/02* (2013.01); *B23K 26/16* (2013.01); *B23K 26/70* (2015.10); *B23K 2101/003* (2018.08); *F02F 3/003* (2013.01); *F02F 3/10* (2013.01); *F02F 3/26* (2013.01); *F02F 2003/0061* (2013.01)

(58) Field of Classification Search
CPC ..... B23P 6/02; B23P 6/00; B23P 6/005; F02F 3/26; F02F 3/003; F02F 2003/0061; F02F 3/10; B23K 26/16; B23K 26/70; B23K 2101/003
See application file for complete search history.

(56) References Cited

U.S. PATENT DOCUMENTS

| | | | |
|---|---|---|---|
| 3,190,273 A | 6/1965 | Bachle et al. | |
| 3,914,574 A | 10/1975 | Hill et al. | |
| 6,026,777 A | 2/2000 | Kemnitz et al. | |
| 6,327,962 B1 | 12/2001 | Kruse | |
| 9,440,310 B2 | 9/2016 | Wilder | |
| 9,550,256 B2 | 1/2017 | Clark | |
| 9,631,576 B2 | 4/2017 | Lapp et al. | |
| 9,726,109 B2 * | 8/2017 | Boczek | F02F 3/20 |
| 2005/0132569 A1 | 6/2005 | Clark et al. | |

(Continued)

FOREIGN PATENT DOCUMENTS

| | | |
|---|---|---|
| CN | 104141131 A | 11/2014 |
| DE | 2141054 | 3/1973 |

(Continued)

*Primary Examiner* — Joseph J Dallo
*Assistant Examiner* — Kurt Philip Liethen
(74) *Attorney, Agent, or Firm* — Hibshman Claim Construction PLLC

(57) ABSTRACT

A remanufactured piston for an internal combustion engine includes a crown and a skirt. A piston body includes a first piston body end within the crown and an opposite second piston body end. The crown further includes an annular crown body having an annular crown body edge. The first piston body end further includes an annular piston body edge. The annular piston body edge and the annular crown body edge form a joint, and a metallurgical bond attaches the annular crown body to the piston body at the joint.

13 Claims, 5 Drawing Sheets

(56) References Cited

U.S. PATENT DOCUMENTS

| | | | |
|---|---|---|---|
| 2008/0041333 A1* | 2/2008 | Jarrett | F02F 3/0023 123/254 |
| 2009/0020007 A1 | 1/2009 | Lin et al. | |
| 2012/0080004 A1* | 4/2012 | Menezes | F02F 3/22 123/193.6 |
| 2012/0222644 A1* | 9/2012 | Bing | B23K 26/28 123/193.6 |
| 2012/0222645 A1* | 9/2012 | Edel | F02F 3/22 123/193.6 |
| 2013/0014723 A1 | 1/2013 | Bucher | |
| 2013/0104838 A1* | 5/2013 | Spangenberg | F02F 3/16 123/193.6 |
| 2014/0298987 A1* | 10/2014 | Luick | F16J 1/00 92/172 |
| 2015/0184613 A1 | 7/2015 | Linke | |
| 2017/0057023 A1 | 3/2017 | Sharp et al. | |
| 2018/0045137 A1 | 2/2018 | Lin et al. | |

FOREIGN PATENT DOCUMENTS

| | | |
|---|---|---|
| DE | 102011107656 | 1/2013 |
| DE | 102012014200 | 5/2014 |
| EP | 592179 A1 | 4/1994 |
| EP | 1077323 | 2/2001 |
| EP | 2188513 | 3/2017 |
| GB | 1364429 | 8/1974 |
| GB | 2163072 | 10/1986 |
| WO | 2005024216 | 3/2005 |
| WO | 2005046928 | 5/2005 |
| WO | 2007093289 | 8/2007 |
| WO | 2014146637 | 9/2014 |

\* cited by examiner

REMANUFACTURED ENGINE PISTON AND METHOD

TECHNICAL FIELD

The present disclosure relates generally to pistons for use in an internal combustion engine and, more particularly, to remanufacturing used or damaged pistons.

BACKGROUND

A great many different operating strategies and component designs are known in the field of internal combustion engines. Research and development has progressed for decades in relation to the manner in which factors such as fueling, exhaust gas recirculation, turbocharging, and variable valve actuation can be varied to produce different results. In addition to variation in these and other operating parameters, a great deal of research and testing effort has gone into the different ways that engine components, such as pistons, can be shaped and proportioned, and formed from various materials. Efforts to accommodate the various different patterns of engine operation and duty cycle have resulted in the great many engine operating strategies and component designs that can be seen in the art.

While advances in this area have led to some success in extending the service life or enabling remanufacturing of pistons generally, the harsh conditions within engine cylinders that pistons are subjected to during use can damage components of the piston, often requiring the damaged piston to be replaced prematurely or not being considered capable of remanufacturing once defects or damage are discovered. Further, the diversity of designs in the field population of engines has continued to increase. Changed specifications can further complicate attempts to remanufacture pistons for successfully returning pistons to service.

One attempt to repair pistons is disclosed in European Patent No. 592,179 to Malcolm ("Malcolm"). Malcolm is directed to a method for reconditioning engine parts that includes machining a worn surface to be substantially flat, placing an annular repair part adjacent to an annular surface, welding the repair part to the annular surface, and then machining a working surface to desired specifications. While Malcolm's repair method may work in some instances, there remains ample opportunity for improvement.

SUMMARY OF THE INVENTION

In one aspect, a piston for an internal combustion engine includes a piston body formed of a piston body material, and an annular crown body formed of a crown body material. The piston body defines a longitudinal axis extending between a first piston body end and a second piston body end, the first piston body end including a combustion bowl and a piston body edge extending circumferentially around the longitudinal axis. The annular crown body includes a crown body edge extending circumferentially around the longitudinal axis, the crown body edge being positioned in facing relation to the piston body edge to form a joint. The piston further includes a metallurgical bond attaching the annular crown body to the piston body at the joint, and formed at least in part from the piston body material of the piston body, and the crown body material of the annular crown body.

In another aspect, a method for making a piston for an internal combustion engine includes forming a piston body edge that includes a combustion bowl having a concave outer section and a backside cooling surface opposite the concave outer section. The method further includes coupling the piston body with an annular crown body blank that includes a crown body edge structured to form a joint with the piston body edge such that the piston body edge and the crown body edge are positioned in facing relation, and bonding the annular crown body blank to the piston body by way of forming a metallurgical bond at the joint.

In still another aspect, a crown assembly for a piston includes a piston body end of a piston body formed of a piston body material, the piston body end having an annular piston body edge and a combustion bowl that includes a concave outer section and a backside cooling surface opposite the concave outer section. The crown assembly further includes a crown body blank formed of a crown body material, and including an upper surface forming an annular rim, an outside surface, an inside curved surface opposite the outside surface, and an annular crown body edge, the annular crown body edge positioned in facing relation with the piston body edge to form a joint.

DETAILED DESCRIPTION

Figure 1:
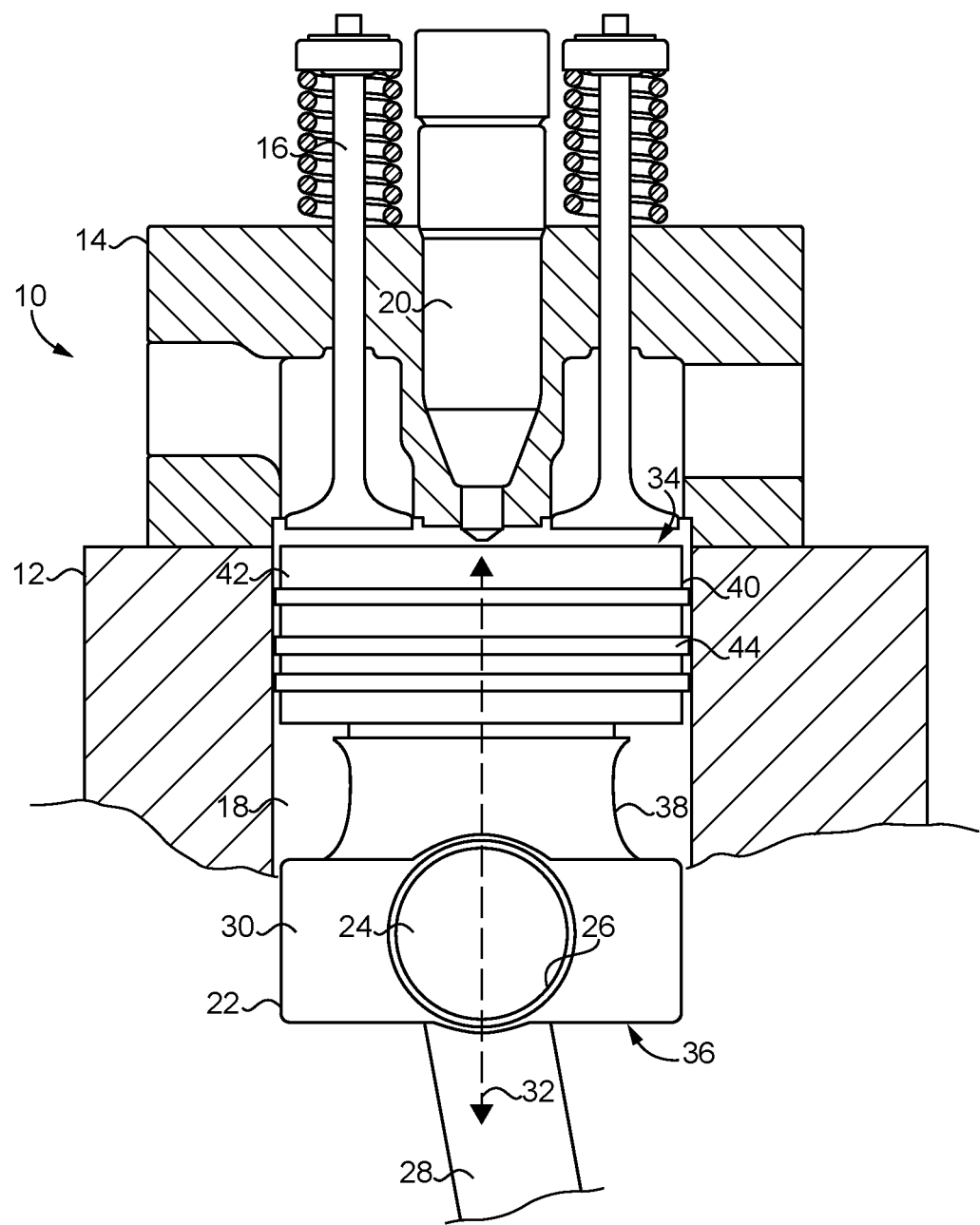
FIG. 1 is a partially sectioned diagrammatic side view of an engine, according to one embodiment.

Referring to FIG. 1, an embodiment of an internal combustion engine ("engine") 10 is shown. Engine 10 may be a compression ignition diesel engine, including an engine housing 12 and an engine head 14 coupled to engine housing 12. A plurality of gas exchange valves 16 may be positioned at least partially within engine head 14, and movable in a conventional manner to admit air into a cylinder 18 formed in engine housing 12, and permit exhaust to be expelled from cylinder 18, according to a conventional four-stroke engine cycle. Engine 10 may further be direct injected, and to this end, includes a fuel injector 20 positioned within engine head 14 and extending into cylinder 18 for direct injection of a fuel. Engine 10 will typically be a multi-cylinder engine, having 4, 6, 8, 10, 12, or more engine cylinders, although only one cylinder 18 is depicted in FIG. 1. Each of a plurality of cylinders formed in engine housing 12 may be associated with at least one intake valve and at least one exhaust valve, and a fuel injector. In other embodiments, a port injected design or some other fuel injection or fuel delivery strategy may be used. A piston 22 is movable within cylinder 18, analogously to any of the other pistons and cylinders that might be part of engine 10, between a bottom dead center (BDC) position and a top dead center (TDC) position in a generally conventional manner.

Piston 22 may be coupled with a wrist pin 24, positioned within a wrist pin bore 26, that is in turn coupled with a connecting rod 28 coupled with a crankshaft (not shown). A piston body 30 defines a longitudinal axis 32, extending between a first axial piston body end ("first body end") 34 and a second axial piston body end ("second body end") 36. Piston 22 includes a skirt piece ("skirt") 38 that has second body end 36, and a crown piece ("crown") 40 that has first body end 34. Piston rings 44 are shown positioned upon piston 22, each being positioned within and obscuring a piston ring groove formed within crown 40. Although no cylinder liner is shown in FIG. 1, those skilled in the art will appreciate that a cylinder liner would typically be used such that piston 22 actually reciprocates within a cylinder liner positioned within engine housing 12.

Figure 3:
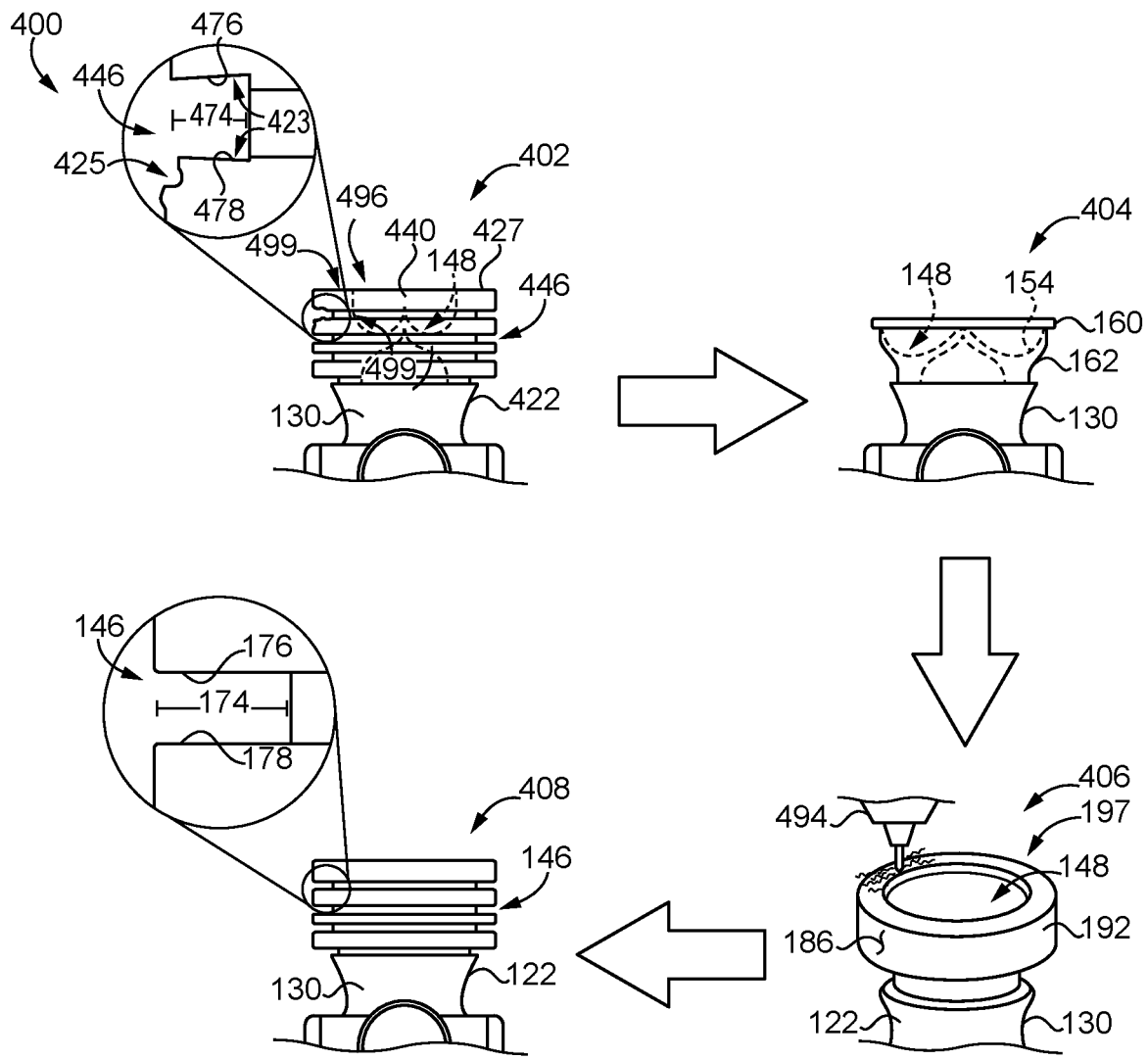
FIG. 3 is a diagrammatic illustration of exemplary process flow for piston remanufacturing, according to one embodiment.

It has been observed that, in the normal course of operation, reciprocation of piston 22 within cylinder 18 between the BDC position and the TDC position, a cycle which may be repeated millions of times, or even greater, over the course of a service life of engine 10, may result in piston 22 becoming damaged, worn, corroded, deformed, or otherwise out of original specifications. As crown 40 is generally exposed to harsher conditions than skirt 38, the risk of crown 40 becoming damaged is particularly acute. Crown 40 can also be damaged during handling prior to installation of piston 22 for service, or after removal at engine tear-down. For instance, piston rings 44 are structured to, amongst other things, contact cylinder 18 during piston reciprocation and are exposed to high pressures. Piston rings 44 are therefore typically structured to resist wear to the greatest practical extent, and can be formed of hard, durable metals. Under certain operating conditions, piston rings 44 may actually end up damaging piston 22. For example, inadequate lubrication or imprecise machining of piston rings 44 or the piston grooves, or simply normal wear and tear, may cause piston rings 44 to move within the piston grooves and/or cause yielding of piston material that is contacted during operation, leading to deformations 423 (as seen in FIG. 3, discussed hereinafter) in one or more surfaces of the piston groove. Such deformations 423 can cause one or more of the piston grooves to become pinched or widened such that the piston rings 44, for instance, cannot be properly seated therein. Lubrication issues can exacerbate these factors. Additionally, contaminants, mishandling, or material imperfections can also cause chips, scratches, dents, or other deformations ("chips") 425 (as seen in FIG. 3, discussed hereinafter). These and other issues may result in specification-violating damage to crown 40, rendering piston 22 unsuited for returning to service or even requiring piston 22 to be prematurely removed from service. The piston 22 shown in FIG. 1 is an exemplary piston suitable for use in engine 10, and may be a newly manufactured piston or a piston remanufactured according to the present disclosure.

Figure 2:
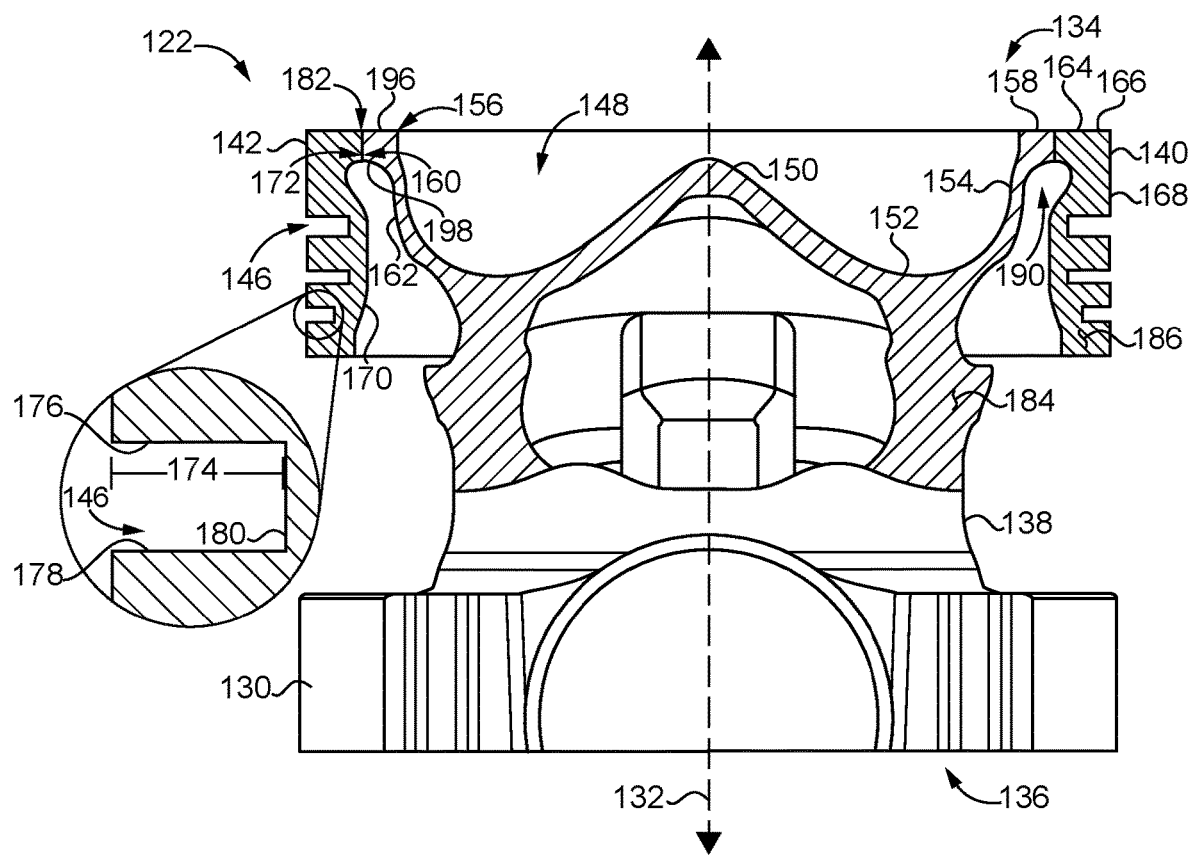
FIG. 2 is a partially sectioned diagrammatic side view of a piston, according to one embodiment.

Referring now also to FIG. 2, a partially sectioned view of a piston 122 is shown, wherein piston 122 is a remanufactured piston (hereinafter "remanufactured piston 122"). Remanufactured piston 122 may be similar to piston 22 in many respects. For example, remanufactured piston 122 also includes a piston body 130 that defines a longitudinal axis 132 extending between a first axial piston body end ("first body end") 134 and a second axial piston body end ("second body end") 136. A crown piece ("crown") 140 of remanufactured piston 122 includes first body end 134, which is formed of a piston body material 184, and an annular crown body 142 formed of a crown body material 186, and includes an annular crown body 142 attached to first body end 134 by a metallurgical bond 188. Further, piston body 130 may be a used piston body salvaged from a piston removed from service. In other embodiments, piston body 130 might be salvaged from a piston that might not have ever been used in service. For example, embodiments are contemplated in which piston body 130 is salvaged from an unused piston structured for use in one engine and remanufactured for use in a different engine. In this way, the present disclosure can enable pistons to be retrofitted for use in engines for which pistons may be difficult to locate, or allow pistons structured to be used in older engines to be remanufactured for use in a more modern engine, among other things.

First body end 134 of remanufactured piston 122 includes a combustion bowl 148 having a convex center section 150 transitioning radially outward and axially downward to a combustion bowl floor 152, and a concave outer section 154 transitioning radially outward and axially upward from combustion bowl floor 152. An annular rim 158 extends circumferentially around combustion bowl 148 and may have a substantially planar profile, although the present disclosure is not thereby limited and rim 158 could be rounded. Annular rim 158 and surfaces 150, 152 of combustion bowl 148 may form an upper combustion face 196 that can form part of a combustion chamber when remanufactured piston 122 is within cylinder 18. First body end 134 also includes an annular piston body edge ("piston body edge") 160 extending circumferentially around longitudinal axis 132, and a backside cooling surface 162 on combustion bowl 148 positioned generally opposite concave outer section 154. A lower backside surface 198 of piston 122 may be opposite upper combustion face 196, and may include backside cooling surface 168 of combustion bowl 148. The terms "upper" and "lower," "inside" and "outside," "outer" and "inner," and like terms are used herein in a relative sense, in relation to each other when viewing the pistons and/or piston components illustrated, and should not necessarily be taken to mean that the assemblies and devices discussed herein have a particular orientation. Backside cooling surface 168 may be sprayed with oil from an oil sprayer (not shown) positioned vertically below piston 122 when positioned for service in an engine. Although piston body edge 160 is shown adjacent to annular rim 158 in the embodiment of FIG. 2, it will be apparent from the discussion herein that piston body edge 160 may be located at other positions on first body end 134 in other embodiments.

Annular crown body 142 includes an upper surface 164 that may form an annular rim 166, an outside surface 168 adjacent to annular rim 166, an inside surface 170 opposite outside surface 168, and an annular crown body edge ("crown body edge") 172 extending circumferentially around longitudinal axis 132. Inside surface 170 may have a curved profile in many embodiments (hereinafter "inside curved surface 170"), and may transition to backside cooling surface 162 to form an oil gallery 190. It will be appreciated that piston body 160 and crown body edge 172 include surfaces positioned on piston body 130 and annular crown body 142, respectively, as can be seen in the appended drawings. "Transition," as it is used in the present context, may be understood to mean that the corresponding surfaces meet to form a surface having a substantially uniform and continuous profile. In other words, a curve defined by inside curved surface 170 transitions with a curve defined by backside cooling surface 168, together forming a single curve, and such that an endpoint of the curve defined by inside curved surface 170 is also an endpoint of the curve defined by backside cooling surface 168. In this way, a transition between inside curved surface 170 and backside cooling surface 168 may form a relatively uniform curvature within oil gallery 190.

Piston rings are removed in FIG. 2 to illustrate additional features of remanufactured piston 122, including piston ring grooves 146, which are formed in outside surface 168 of annular crown body 142. Each piston ring groove 146 may include an upper groove surface 176, a lower groove surface 178, which may be-but is not necessarily-substantially parallel with upper groove surface 176, and an inner groove surface 180 disposed between groove surfaces 176, 178 that defines a groove depth 174. Groove surfaces 176, 178, 180 may also all be substantially planar, although other profiles are possible such as slightly conical profiles. It will be appreciated that annular crown body 142 may be manufactured to have one or more specifications consistent with or otherwise within an acceptable tolerance of the corresponding specifications of crown 40. For instance, as seen in the detailed enlargement of FIG. 2, piston ring grooves 146 may have particular geometric and/or dimensional specifications that should be understood to match the corresponding geometric and/or dimensional specifications of piston ring grooves of piston 22 within the same tolerances.

Piston body edge surface 160 and crown body edge surface 172 may have complementary profiles such that, when positioned in facing relation, edges 160, 172 can form a joint 182 between piston body 130 and annular crown body 142. In an embodiment, each of edges 160,172 generally form a straight line segment in the profile view of edges 160, 172 shown in FIG. 2, and are oriented generally parallel to longitudinal axis 132. In other embodiments, edges 160, 172 might be angled relative to longitudinal axis 132 and/or may be curved, have a notch, or any other suitable profile. Joint 182 may extend from upper combustion face 196 to lower surface 198. Specifically, joint 182 may extend from annular rim 158 to oil gallery 190 such that joint 182 bisects the curve formed by the transition between inside curved surface 170 and backside cooling surface 162 within oil gallery 190. In other embodiments, joint 182 may have a different location or geometry, however. For example, as will be seen in the embodiment of FIG. 6, a joint 382 may extend from an upper combustion face 396 at a combustion bowl 348, to a lower backside surface 396 at a lower backside surface 398 within an oil gallery 390. Still other positions and/or geometries of joint 182 are also contemplated.

Figure 4:
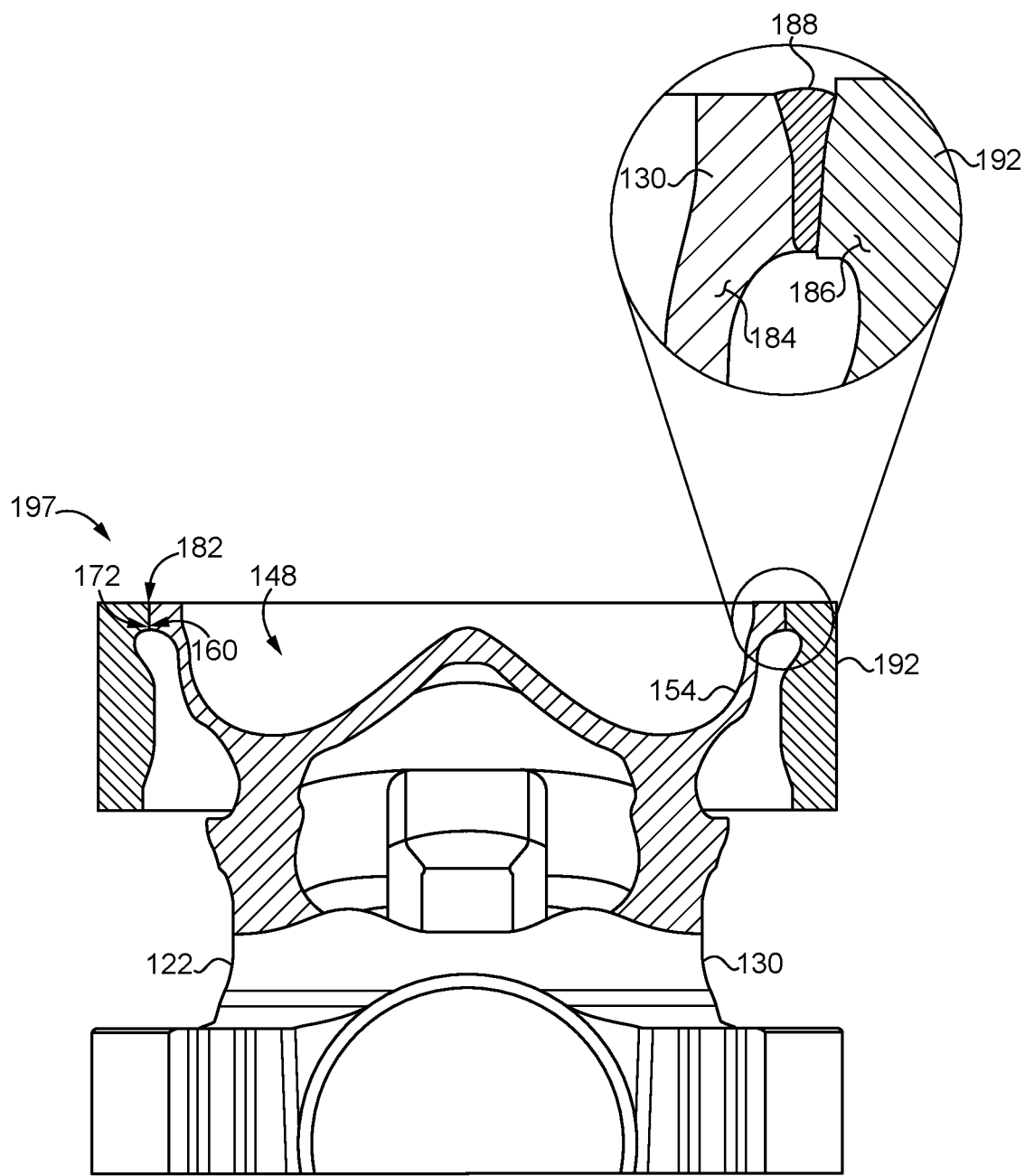
FIG. 4 is a partially sectioned diagrammatic view of a crown assembly, according to one embodiment.

Metallurgical bond 188 will typically be formed by welding piston body 130 to annular crown body 142 or an annular crown body blank ("crown blank") 192 (as seen in FIGS. 3 and 4, discussed hereinafter). As will be apparent from the discussion herein, annular crown body 142 may be formed by crown blank 192 after machining to specifications. Metallurgical bond 188 (hereinafter "weld interface 188") may be an autogenous weld formed by laser beam welding (LBW) or electron beam welding (EBW), although other suitable welding strategies such as friction welding, for instance, inertial welding, might also be used. As an autogenous weld, weld interface 188 will be formed of a mixture of piston body material 184 and crown body material 186. Piston body material 184 and crown body material 186 may be the same type, formulation, or class of materials in some embodiments, or might even have substantially identical material compositions, although piston body material 184 will typically be used material salvaged from piston 22. Substantially identical compositions may be literally identical within measurement error but for the presence of impurities. For example, body materials 184, 186 may include iron, steel, or aluminum, or may include any other materials suitable for use in engine 10. As a result of the different conditions to which piston body material 184 may have been subjected, body materials 184 and 186 might have different microstructures detectable microscopically, or exhibit other distinguishing features that are visible only with the assistance of microscopy or other destructive or non-destructive inspection techniques. Moreover, a microstructure of weld interface 188 may be different from those of body materials 184 or 186, with this or other differences visible with the assistance of microscopy or potentially even to the unaided eye.

In some embodiments, different bonding or welding techniques may be utilized in the formation of weld interface 188, including heterogenous welding techniques that use one or more filler materials. For instance, merely by way of example, in some circumstances it may be desirable to use a filler material to slow quenching, to avoid the formation of a metallurgical notch, to achieve a smooth transition between surfaces, or for still other reasons. In other embodiments, weld interface 188 could be formed by hybrid welding techniques in which weld interface 188 is formed in part by an autogenous welding technique and in part by a heterogenous welding technique involving the use of one or more filler materials.

INDUSTRIAL APPLICABILITY

According to conventional wisdom within the engine and piston fields, repair or refurbishment of used pistons—and damaged piston in particular—is a practice that is at best limited and, more commonly, not even possible. Currently, efforts to repair piston crowns are centered around spot welding visible damage or filling piston grooves with welding material, then machining the excess weld material to achieve a desired specification. Such repairs, however, may be inadequate to repair damaged pistons or at least lack broad applicability. Piston failure or performance degradation risk can render attempts at these types of piston repairs disfavored. Repair of damaged, used, or otherwise out of spec pistons with sufficient quality to return to service has long been elusive, and it has been standard practice to replace rather than repair.

Not only is the repair of used and/or damaged pistons likely to be considered economically inefficient or altogether impracticable according to known techniques, given that salvage of used or damaged pistons still may have some scrap value, the time and/or resources necessary to repair or refurbish used or damaged pistons, even if possible, has rarely been seen as economically justified over the standard practice of wholesale replacement. In the field of remanufacturing generally, it is typically desirable or even critical that remanufactured devices and/or components be returned to a state as good as or better than new, particularly with regard to geometric dimensioning and tolerancing, surface finish, and still other attributes. For this reason, there are often disincentives to adopting any particular remanufacturing technique where achievement of such specifications would be compromised, difficult, or unpredictable. According to the present disclosure, and as further discussed herein, the selective removal of used and/or damaged material of a piston and replacement with newly formed components or materials enables restoration of a functional part returned to a state as good as or better than new without unduly burdensome requirements for holding tolerances or achieving other specifications at critical stages of processing.

Referring now also to FIG. 3, a diagrammatic process flow is illustrated at 400 for making remanufactured piston 122. In the embodiment of FIG. 3, making remanufactured piston 122 includes remanufacturing a used, damaged, or otherwise out of spec piston ("damaged piston") 422. At element number 402, damaged pistons 422 may be received—by shipment or by taking physical custody in a warehouse, for example—and then sorted based on one or more criteria indicative of suitability for or appropriateness of remanufacturing. One criterion that may be indicative of suitability for remanufacturing, where other criteria are acceptable, is the presence of certain observable or measurable forms of damage to a crown piece ("crown") 440 and, more specifically, piston ring groove damage. Pistons with certain types of crown piece damage that are otherwise in acceptable condition can be sorted to a processing path for remanufacturing. Other pistons that do not show such damage could be sorted to another processing path for reuse or a different type or manner of remanufacturing. Where crown piece damage, namely, piston ring groove damage is too severe, or other types of non-repairable damage are evident, a piston may be sorted to scrap. In a practical implementation strategy, a tool may be used to measure a dimension of a piston ring groove 446 during sorting. For example, the tool may have a height dimension or a depth dimension that simulates a height or depth dimension of a piston ring, such that inserting, or attempting to insert, the tool into piston ring groove 446 may allow a technician to quickly determine if a piston, including damaged piston 422, may be returned to service without modifying or repairing the piston ring grooves or whether it may instead be a candidate for repair of at least those features. Sorting damaged pistons 422 can be a practical strategy for implementing the present disclosure as remanufacturing every damaged piston 422 is unlikely to be practical or economically justified. Sorting may further include evaluating properties of each damaged piston 422 to determine whether the corresponding piston body 130 may be suitable for, and needs, remanufacturing, before returning to service. Such a determination may be made based on objective measurements using one or more tools, observations, and/or calculations, although, in some instances, a technician could use his or her engineering or service experience to judge whether a damaged piston 422 should be remanufactured.

The damaged piston 422 shown at element number 402 may be an exemplary one that illustrates a variety of types of specification-violating damage evident in crowns 440. For example, piston ring groove 446 of crown 440 show deformations 423 in both an upper groove surface 476 and a lower groove surface 478, which might have been caused by inter-groove movement of a piston ring, or deforming of the piston body in response to forces exerted on the piston body by the piston rings, during reciprocation of damaged piston 422 within a cylinder. As mentioned above, and as can be seen in FIG. 3 at element number 402, groove surfaces 476, 478 might be angled to each other rather than substantially parallel, which may be the result of piston ring grooves 446 being partially pinched together, preventing a piston ring (or a gauging tool) from being inserted, or being partially widened such that a piston ring may not properly seat. Further, piston ring groove 446 could have a dent or chip 425 and may have experienced wearing on an outside surface 468 of crown 440, resulting a groove depth 474 that may be out of specification.

At element number 404, piston body edge 160 may be formed on piston body 130. Forming piston body edge 160 may include removing a portion of crown 440 from piston body 130 of damaged piston 422 after sorting. For example, removing a portion of crown 440 may include cutting crown from piston 422, which can be accomplished by any appropriate methods such as using a plasma cutter, torch, saw, or angle grinder. The removal of crown 440 from damaged piston 422 may leave piston body 130. The location of any such cut can be selected based on one or more qualities, calculations, analyses, or measurements of damaged piston 422. Those of skill in the art will readily appreciate that the precise cut location may be at least somewhat dependent upon a qualitative evaluation by a servicing technician. Merely by way of example, such qualitative evaluation may include inspection of damaged piston 422 to determine the extent and/or location of any damage, and particularly any damage within crown 440. Consideration of the bonding strategy that may be used to attach crown blank 192 may also be contemplated in selecting a cut location in some embodiments. The cut location may be selected from among one or more suitable cut zones 499 that might be determined based on an analysis of the material or structural composition of the type or class of piston at issue. Cutting damaged piston 422 to form piston body edge 160 may include cutting damaged piston 422 from an upper combustion face 496 to a lower backside surface (not shown), wherein upper combustion face 496 might include an annular rim 427 of crown 440 and surfaces within combustion bowl 148, and the lower backside surface may include surfaces of an oil gallery (not shown). Damaged piston 422 of the present embodiment may have two suitable cut zones 499, one being located upon an annular rim 427 of crown 440 approximately above the oil gallery, and another being within combustion bowl 148. In other embodiments, piston 422 may have greater or fewer cut zones 499, including no preidentified cut zones.

In other embodiments, piston body edge surface 160 might be formed after removing part or all of crown 440. For example, a surface of piston body 130 could be machined after a part of crown 440 is removed such that piston body edge 160 has a particular location, geometry, structure, or other characteristic. In still other embodiments, forming piston body edge 160 could mean manufacturing piston body 130 to have a suitable piston body edge 160. For example, in an embodiment, it may be desirable to manufacture piston body 130 separately from annular crown body 142 such that piston body 130 might be structured to receive crown body blank 192 without having to partially remove crown 440. In other words, crown body 130 might be a newly manufactured crown body. In such embodiments, crown body 130 might be manufactured to include piston body edge 160 such that piston body 130 may not have to be machined, or might only have to undergo minimal machining, prior to coupling with crown body blank 192, as discussed hereinafter.

At element number 406, crown blank 192 may be coupled with piston body 130 to form a crown assembly 197. Referring now also to FIG. 4, a partially sectioned view of crown assembly 197 is shown. As discussed above, the structure of crown blank 192 may be generally similar to the structure of annular crown body 142. Crown blank 192 may therefore be formed of crown body material 186, and may include crown body edge 172, although in some embodiments crown blank 192 could be machined such that a profile of crown body edge 172 corresponds with a profile of piston body edge 160. References to the surfaces of crown blank 192 may correspond to surfaces of annular crown body 142, it being understood that crown blank 192 shows the surfaces before machining and annular crown body 142 shows the surfaces after machining.

Figure 5:
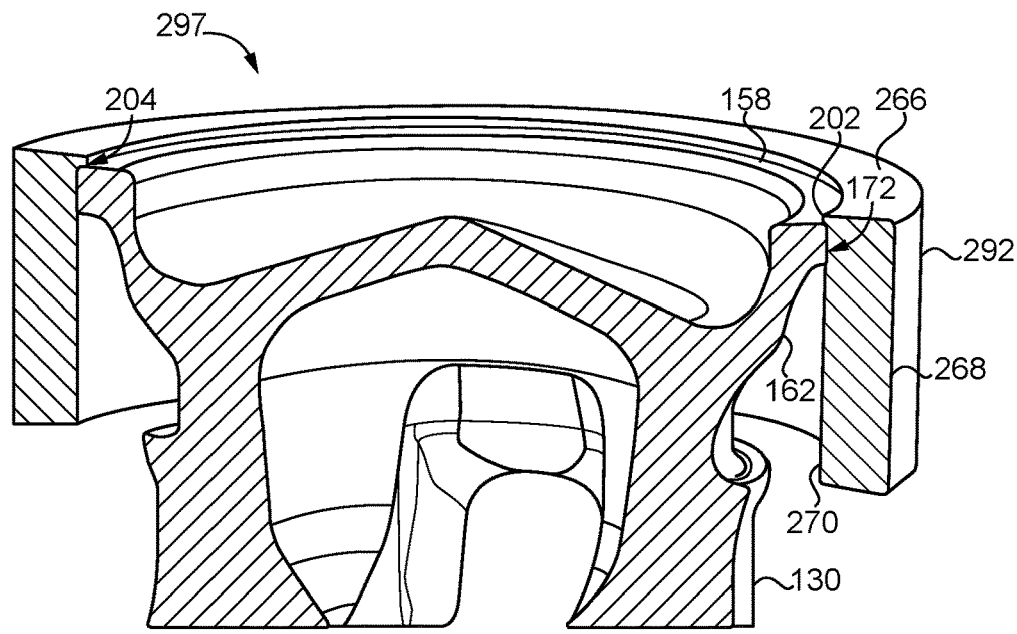
FIG. 5 is a partially sectioned diagrammatic view of a crown assembly, according to a second embodiment.

Referring now to FIG. 5, a sectioned view of a crown assembly 297 that includes an annular crown body blank ("crown blank") 292 upon piston body 130 is shown according to a second embodiment. Crown blank 292 is similar to crown blank 192 in many respects, except crown blank 292 includes an annular lip 202 adjacent to an annular rim 266 and above crown body edge 172. It should be noted that like reference numerals identify like features across different embodiments without further explanation, it being understood that such features may be identical in construction and function to their counterparts discussed above. Where different reference numerals are used for identical or similar features across different embodiments, the corresponding element names and numbers will be provided for reference. It should nevertheless be appreciated that no limitation is intended by way of the use of any particular reference numeral. Absent discussion of material differences, different embodiments should generally be understood to be alike in structure and function. Components described in connection with one embodiment may be included in other embodiments in which these components are not described or discussed. Unless expressly stated otherwise, components across embodiments having like features or functions can be understood as having like structures regardless of terminology.

Annular lip 202 may be structured such that when crown blank 292 is positioned upon piston body 130, annular lip 202 sits upon annular rim 158, forming a step 204. Step 204 allows crown blank 292 to be placed upon piston body 130 without having to use a fixture or other support structure to maintain the relative positions of crown blank 292 and piston body 130 during welding or bonding. Upon welding the parts together annular lip 202 can provide material to be incorporated into the weld. Additionally, as can be seen in FIG. 5, crown blank 292 might not be premachined to specifications of piston 22 prior to being coupled with piston body 130. Both an outside surface 268 and an inside surface 270 of crown blank 292 are oriented substantially parallel to each other. Outside surface 268 might not include any piston ring grooves and might not have a curved inside surface 270 prior to coupling with piston body 130.

Figure 6:
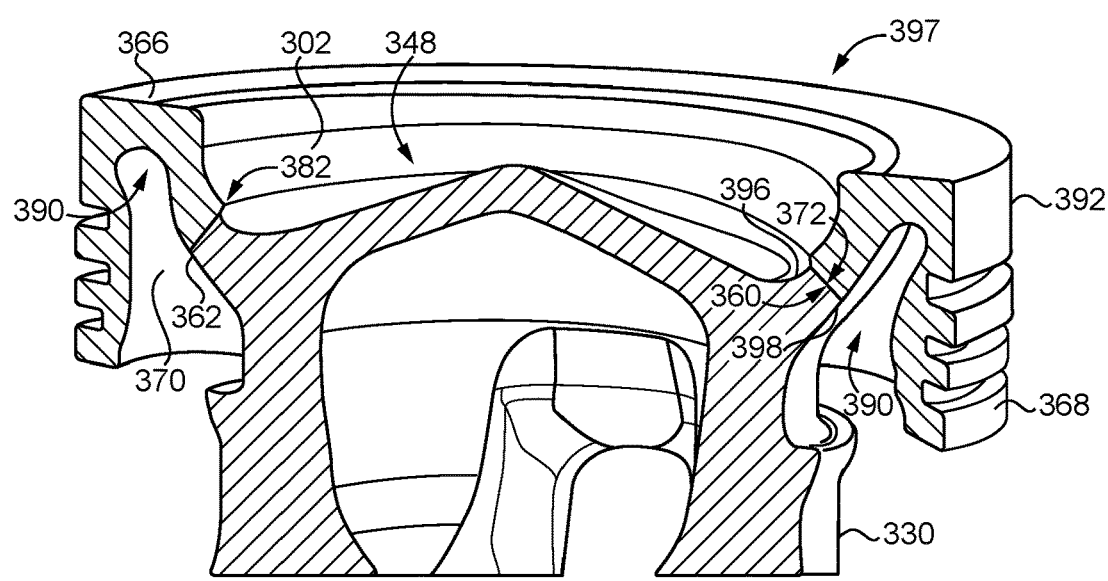
FIG. 6 is a partially sectioned diagrammatic view of a crown assembly, according to a third embodiment.

Referring now to FIG. 6, a sectioned view of a crown assembly 397 that includes an annular crown body blank ("crown blank") 392 upon a piston body 330 is shown according to a third embodiment. Crown blank 392 is similar to crown blank 192 in many respects, except crown blank 392 includes a combustion bowl transition surface 302 positioned below an annular rim 366. Accordingly, an annular crown body edge 372 of crown blank 392 may be positioned axially below an annular rim 366, and may be adjacent to combustion bowl transition surface 302. Additionally, piston body 330 may be structured differently than piston body 130 to accommodate combustion bowl transition surface 302. For instance, a piston body edge 360 of piston body 360 may be adjacent to a surface of a combustion bowl 348.

Referring still to FIG. 6, it can be seen that both an outside surface 368 and an inside surface 370 of crown blank 392 may be premachined, such as to a near net shape. In this way, when crown blank 392 is positioned upon piston body 330, inside surface 370 may transition with a backside cooling surface 362 of piston body 330, forming an oil gallery 390. It will be appreciated, however, that some machining may still be required, and desirable, such that combustion bowl transition surface 302 forms a smooth transition with an adjacent surface of a combustion bowl 348.

Returning to the embodiment of FIGS. 1-4, it can be seen that piston 122 may be formed by bonding crown blank 192 to piston body 130 by way of a welding device 144 structured to form weld interface 188 (hereinafter "welding device 494"). Weld interface 188 may be formed by a keyhole welding technique such that weld interface 188 achieves full penetration between upper combustion face 196 and a lower backside surface 198. The present disclosure is not limited to keyhole welding techniques, however, and any suitable welding or bonding technique may also be used. In some embodiments, a suitable welding or bonding technique may be selected based upon one or more criteria such as a size or position of joint 182, the material composition of body materials 184, 186, or the structure of edges 160, 172, upper combustion face 196, or lower backside surface 198.

Those skilled in the field of remanufacturing will be familiar with the general principle of returning a used component to a condition as good or better than new as discussed above. For remanufactured parts, a set of tolerances and surface finishes known from newly manufactured parts will typically be applied to the remanufacturing of used parts. In one aspect, weld interface 188 may be structured such that remanufactured piston 122 has a level of structural integrity that matches or surpasses that of piston 22. Achieving full weld penetration as described above may be one strategy that enables remanufactured piston 122 to have the requisite structural properties. In a practical implementation strategy, welding device 494 may be positioned about 90 degrees normal to upper combustion face 196 to assist in weld interface 188 achieving full weld penetration between upper combustion face 196 and lower backside surface 198. In embodiments such as that seen in FIG. 6 in which upper combustion face 396 is welded at a curved surface, welding device 494 may be positioned about 90 degrees normal to the curve of the upper combustion surface at the weld location.

In still another aspect, one or more surfaces of crown blank 192 may be machined to match a specification of piston 22 within an acceptable tolerance. As seen at element number 408, machining of crown blank 192 may include forming piston ring grooves 146 in outside surface 168 such that piston ring grooves 146 have a suitable groove depth 174 and/or such that groove surfaces 176, 178, 180 have a suitable geometry. Crown blank 192 may also have dimensional specifications that "exceed" those of crown 40 such extra material is provided so that crown blank 192 can be machined down to specifications once attached to piston body 130. For instance, annular rim 166 of crown blank 192 may be machined such that annular rim 166 of annular crown body 142 transitions with annular rim 158 of piston body 130. Inside surface 170 of crown blank 192 may also be machined to transition with backside cooling surface 162, forming oil gallery 190.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A piston for an internal combustion engine, the piston comprising:
   a piston body formed of a piston body material, and defining a longitudinal axis extending between a first piston body end and a second piston body end, the first piston body end including a combustion bowl, a piston body edge surface extending circumferentially around the longitudinal axis, and a lower backside surface, the piston body edge surface extending from an upper combustion face at the first piston body end to an oil gallery of the piston;

the lower backside surface being disposed opposite the upper combustion face;

an annular crown body formed of a crown body material, and including a crown body edge surface extending circumferentially around the longitudinal axis, the crown body edge surface extending from the upper combustion face to the oil gallery, the crown body edge surface being positioned in facing relation to the piston body edge surface to form a joint; and a metallurgical bond attaching the annular crown body to the piston body at the joint, and formed at least in part from the piston body material of the piston body and the crown body material of the annular crown body, the matallurgical bond extending from the upper combustion face to the lower backside surface, wherein the combustion bowl includes a concave outer section and a backside cooling surface opposite the concave outer section, and the lower backside surface of the piston includes the backside cooling surface of the combustion bowl, wherein the annular crown body includes an inside curved surface that transitions with the backside cooling surface to form the oil gallery, and wherein the joint extends from the concave outer section of the combustion bowl to the oil gallery.

2. The piston of claim 1 wherein the piston is a remanufactured piston, the piston body is a used piston body salvaged from a used piston removed from service in an internal combustion engine, and the piston body edge surface is formed by cutting the used piston body.

3. The piston of claim 1 wherein the piston body material has a substantially identical material composition to the crown body material, and the metallurgical bond is an autogenous weld.

4. A method for making a piston for an internal combustion engine, the method comprising:

forming a piston body edge surface on a piston body that includes a combustion bowl having a concave outer section and a backside cooling surface opposite the concave outer section, the piston body edge surface extending from the concave outer section of the combustion bowl to an oil gallery of the piston, the piston body edge surface extending circumferentially about a longitudinal axis of the piston;

coupling the piston body with an annular crown body blank that includes a crown body edge surface structured to form a joint with the piston body edge surface such that the piston body edge surface and the crown body edge surface are positioned in facing relation, the crown body edge surface extending from the concave outer section of the combustion bowl to the oil gallery; and bonding the annular crown body blank to the piston body by way of forming a metallurgical bond at the joint.

5. The method of claim 4 further comprising sorting a plurality of used pistons based on a crown piece damage criterion, and removing the piston from the plurality of used pistons based on the crown piece damage criterion.

6. The method of claim 5 wherein the crown piece damage criterion includes a ring groove damage criterion.

7. The method of claim 5 wherein the forming of the piston body edge surface includes removing a crown piece from the piston sorted from the plurality of used pistons.

8. The method of claim 7 wherein the forming of the piston body edge surface further includes cutting the piston sorted from the plurality of used pistons from the concave outer section of the combustion bowl to the oil gallery.

9. The method of claim 8 wherein the bonding of the annular crown body blank to the piston body further includes welding from the concave outer section of the combustion bowl to the oil gallery.

10. The method of claim 9 wherein the welding from the concave outer section to the oil gallery includes welding from the concave outer section to the backside cooling surface.

11. A crown assembly for a piston, the crown assembly comprising:

a piston body end of a piston body formed of a piston body material, the piston body end including an annular piston body edge surface and a combustion bowl having a concave outer section and a backside cooling surface opposite the concave outer section, the annular piston body edge surface extending from the concave outer section of the combustion bowl to an oil gallery of the piston, the annular piston body edge surface extending circumferentially about a longitudinal axis of the piston; and a crown body blank formed of a crown body material, and including an upper surface forming an annular rim, an outside surface, an inside surface opposite the outside surface, and an annular crown body edge surface, the annular crown body edge surface extending from the concave outer section of the combustion bowl to the oil gallery, the annular crown body edge surface being positioned in facing relation with the annular piston body edge surface to form a joint.

12. The crown assembly of claim 11 further including a metallurgical bond attaching the crown body blank to the piston body end, and formed at least in part from the piston body material of the piston body end and the crown body material of the crown body blank.

13. The crown assembly of claim 11 wherein the crown body blank further includes an annular lip adjacent to the annular rim, the annular lip forming a step at an annular rim of the piston body that extends circumferentially around the combustion bowl.

\* \* \* \* \*